US009966892B2

(12) United States Patent
Cossart et al.

(10) Patent No.: US 9,966,892 B2
(45) Date of Patent: May 8, 2018

(54) ELECTRONIC MAGNETIC BEARING CONTROLLER WITH AN AUTOMATIC REACTIVE POWER COMPENSATION DEVICE

(71) Applicants: Gregory Cossart, Saint Colomber Pres Vernon (FR); Joaquim Da Silva, Sennely (FR); Lakdar Sadi-Haddad, Nogent-sur-Marne (FR)

(72) Inventors: Gregory Cossart, Saint Colomber Pres Vernon (FR); Joaquim Da Silva, Sennely (FR); Lakdar Sadi-Haddad, Nogent-sur-Marne (FR)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 393 days.

(21) Appl. No.: 14/690,924

(22) Filed: Apr. 20, 2015

(65) Prior Publication Data

US 2015/0300407 A1      Oct. 22, 2015

(30) Foreign Application Priority Data

Apr. 22, 2014   (EP) .................................... 14305591

(51) Int. Cl.
F16C 32/04      (2006.01)
H02P 23/26      (2016.01)
G01D 5/20       (2006.01)

(52) U.S. Cl.
CPC .......... *H02P 23/26* (2016.02); *F16C 32/0446* (2013.01); *G01D 5/2013* (2013.01)

(58) Field of Classification Search
CPC ............. F16C 32/0446; F16C 32/0451; G01D 5/2013; H02P 23/26

USPC ......................................................... 310/90.5
See application file for complete search history.

(56) References Cited

U.S. PATENT DOCUMENTS

| 3,936,727 | A | * | 2/1976 | Kelley, Jr. ............ | G01R 15/142 323/210 |
| 3,963,978 | A | * | 6/1976 | Kelley, Jr. ............ | H02J 3/1864 323/210 |
| 3,992,661 | A | * | 11/1976 | Kelley, Jr. ............ | H02J 3/1864 323/210 |
| 4,052,648 | A | * | 10/1977 | Nola .................... | G01R 21/006 318/810 |

(Continued)

FOREIGN PATENT DOCUMENTS

| DE | 3409448 A1 | 9/1984 |
| EP | 1422492 A1 | 5/2004 |

(Continued)

OTHER PUBLICATIONS

Translation of foreign Patent document DE 3409448 A1 (Year: 1984).*

*Primary Examiner* — Alex W Mok
(74) *Attorney, Agent, or Firm* — Bryan Peckjian; SFK USA Inc. Patent Dept.

(57) ABSTRACT

An electronic magnetic bearing controller for controlling the position of a rotor of an electrical machine supported by an active magnetic bearing the position of which being measured by at least one inductive position sensor having an inductive coil, comprising an automatic reactive power compensation device for automatically compensating the reactive power consumed by the inductive position sensor.

13 Claims, 6 Drawing Sheets

(56) References Cited

U.S. PATENT DOCUMENTS

| | | | | |
|---|---|---|---|---|
| 4,433,276 | A * | 2/1984 | Nola | H02J 3/1892 318/438 |
| 4,469,998 | A * | 9/1984 | Nola | H02J 3/1892 318/729 |
| 5,793,623 | A * | 8/1998 | Kawashima | H02M 1/4225 363/36 |
| 7,642,666 | B2 * | 1/2010 | Ichinose | F03D 7/0284 290/44 |
| 2005/0231214 | A1 * | 10/2005 | Howard | G01B 7/14 324/663 |
| 2008/0106099 | A1 * | 5/2008 | Ichinose | F03D 7/0284 290/44 |
| 2009/0108833 | A1 * | 4/2009 | Ziegler | G01R 15/185 324/117 R |
| 2010/0102560 | A1 * | 4/2010 | Ichinose | F03D 7/0284 290/44 |
| 2011/0035114 | A1 * | 2/2011 | Yoneda | B62D 5/046 701/42 |
| 2011/0187109 | A1 * | 8/2011 | Ichinose | F03D 7/0284 290/44 |
| 2012/0019188 | A1 | 1/2012 | Fukutani et al. | |
| 2013/0328317 | A1 * | 12/2013 | Himmelmann | F03D 9/003 290/55 |
| 2014/0009969 | A1 * | 1/2014 | Yuzurihara | H02M 7/48 363/17 |
| 2014/0021934 | A1 * | 1/2014 | Wu | H02M 3/156 323/311 |

FOREIGN PATENT DOCUMENTS

| | | |
|---|---|---|
| WO | 2004097333 A2 | 11/2004 |
| WO | 2011111058 A2 | 9/2011 |

* cited by examiner

ART ANTERIEUR

ELECTRONIC MAGNETIC BEARING CONTROLLER WITH AN AUTOMATIC REACTIVE POWER COMPENSATION DEVICE

CROSS REFERENCE TO RELATED APPLICATIONS

This is a Non-Provisional Patent Application, filed under the Paris Convention, claims the benefit of European Patent (EP) Application Number 14305591.1 filed on 22 Apr. 2014 (22 Apr. 2014), which is incorporated herein by reference in its entirety.

TECHNICAL FIELD

The present invention relates to magnetic bearings and more particularly to the compensation of reactive power in a magnetic bearings inductive position sensor.

PRIOR ART

Magnetic bearings are used in different rotating machines such as electric motors, compressor, turbines or the like in order to maintain the axial or/and radial positions of a rotating shaft by means of magnetic fields acting on a rotor of the machine.

The bearing force is built using a pair of electromagnets connected to switching amplifiers (classically one switching amplifier per electromagnet) for which the control voltage is adapted by a controller via a correction network. The position of the rotor assembly is detected by position sensors. However, as these sensors are inductive and the inductance value is relative to the rotating machine size, it is necessary to compensate the exact reactive current by means of capacitors to minimize to oscillators losses and dimensions.

FIG. 9 shows a prior art configuration of an electronic magnetic bearing controller of the rotating machine 10 with a reactive power compensation device of an inductive coil 12 of a position sensor of a magnetic bearing of this rotating machine. In the electronic magnetic bearing controller 14, capacitors 16, 18 are connected between the output terminals 20A, 20B of secondary windings 22B of an HF transformer 22 and the input terminals 24A, 24B of a relaying cable 26 connecting the electronic magnetic bearing controller 14 to the rotating machine 10. The primary windings 22A of the HF transformer receives on its input terminals 28A, 28B the outputs of a high frequency oscillator generator 30 the input of which results from a comparison (by a comparator 32) of the output reference 34 and the differential output of a voltage measurement 36 across the inductance coil 12 through a sensing wire 38.

In this prior art configuration, capacitors 16, 18 are adjusted to minimize the reactive currents I1 and I2 in the primary windings 22A and the secondary windings 22B of the HF transformer respectively. Due to the number of parameters for each sensor (the sensor inductance value, the capacitance value of the cable, the global inductance value) and the uncertainties on the relaying cable length (the rotating machine 10 can be far (hundreds of meters) from the electronic magnetic bearing controller 14), the capacitor tuning is made at the machine locating by re-worked soldering on the printed circuit board of the electronic magnetic bearing controller.

SUMMARY OF THE INVENTION

The present invention aims to eliminate the above disadvantages by a more convenient and flexible tuning with an automatic compensation procedure in lieu of a final tuning of the position sensors on the machine location or at OEM location as currently.

For this, it is proposed an electronic magnetic bearing controller for controlling the position of a rotor of an electrical machine supported by an active magnetic bearing the position of which being measured by at least one inductive position sensor having an inductive coil, the controller comprising an automatic reactive power compensation device for automatically compensating the reactive power consumed by the at least one inductive position sensor.

Preferably, the automatic reactive power compensation device receives a reactive current I1, I2 proportional to the current in the inductive coil and delivers a compensation current Icomp across windings of a HF transformer the secondary windings of which being connected to the inductive coil through a relaying cable.

According to different variants, the windings can be primary windings of the HF transformer and the reactive current is a current I1 across the primary windings or the windings can be secondary windings of the HF transformer and the reactive current is a current I2 across the secondary windings or the windings can be auxiliary windings of the HF transformer and the reactive current is a current I1 across primary windings of the HF transformer or a current I2 across secondary windings of the HF transformer.

According to a first embodiment of the invention, the automatic reactive power compensation device comprises a static compensation of reactive current formed by a parallel bank of capacitors each connected in series with an electronic switch controlled by a control circuit receiving the reactive current and delivering open or close control signals for the n electronic switches.

Preferably, that the electronic switches are thyristors or triacs.

According to a second embodiment of the invention, the automatic reactive power compensation device comprises a dynamic compensation of reactive current formed by a half-bridge of two electronic devices each connected in series with a capacitor and controlled by a control circuit receiving the reactive current and delivering a Pulse-width modulation (PWM) control signal for the two electronic devices.

Preferably, that the electronic devices are MOSFET or Silicon Carbide (SiC) MOSFET.

Advantageously, the control circuit comprises a PWM inverter logic operating at a switching frequency between 200 kHz and 1 MHz and receiving a reference voltage from a Proportional-Integral controller (PI controller) which receives an error signal generated by the difference between the reactive current and a reference current. And the reference current is provided by a multiplier receiving on the one hand a set voltage from a PI controller which receives an error signal generated by the difference between a voltage Vdc applied to the two electronic devices and a reference voltage VdcRef and on the other hand a measured voltage Vcomp.

Preferably, the electronic magnetic bearing controller of the invention further comprises a high frequency oscillator generator delivering an output voltage V1 at a high frequency (comprised between 10 and 40 kHz, typically about 20 kHz) for the primary windings to that it is connected.

BRIEF DESCRIPTION OF THE DRAWINGS

The invention will be better understood and further details and advantages thereof will appear more clearly in the following description with reference to the accompanying drawings illustrating embodiments of the invention, and in which.

DETAILED DESCRIPTION

Figure 1:
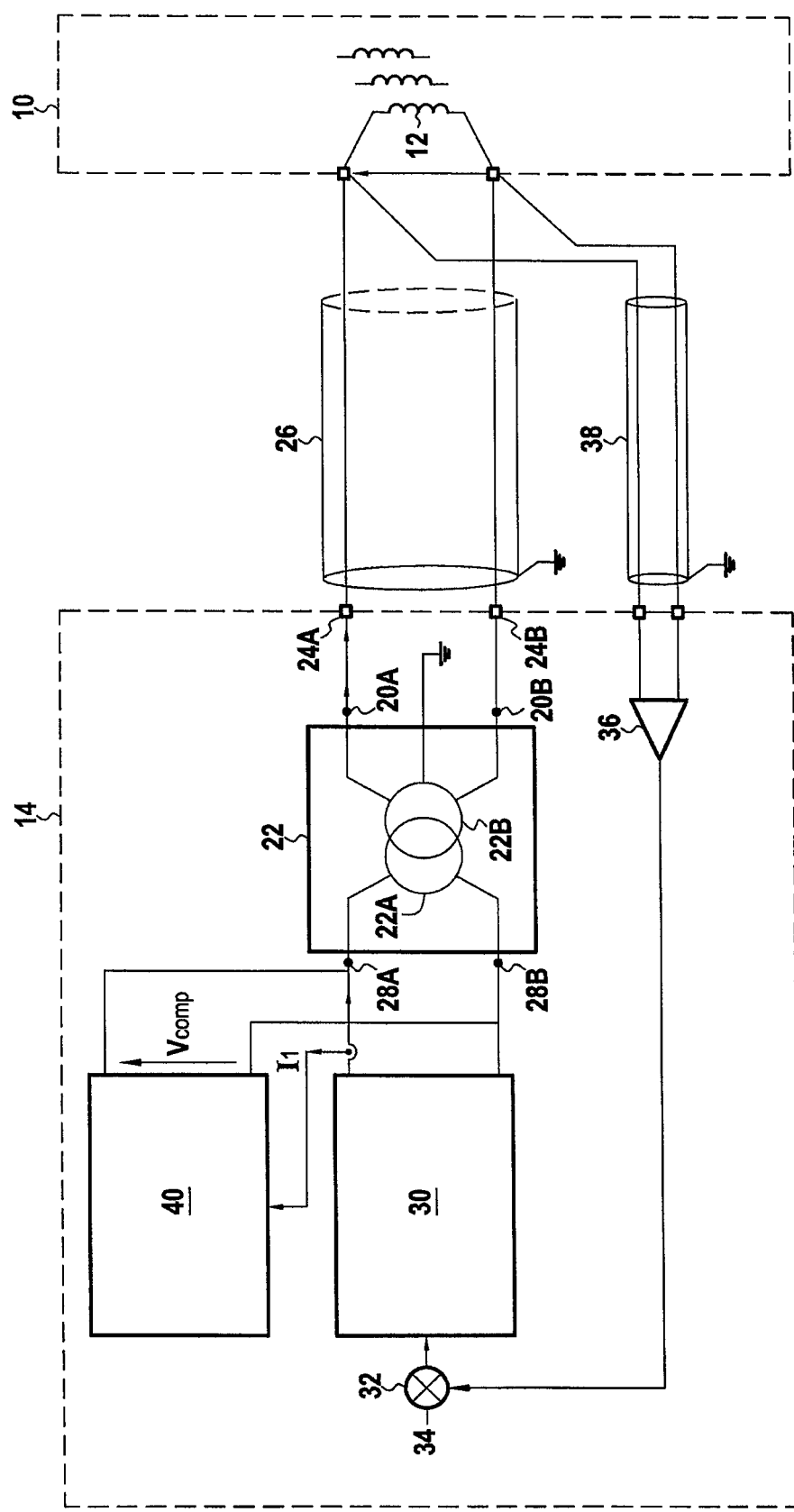
FIG. 1 illustrates a schematic diagram of a first embodiment of an electronic magnetic bearing controller with a reactive power compensation device of an inductive coil of a position sensor according to the invention.

A first embodiment of an electronic magnetic bearing controller of the rotating machine with a reactive power compensation device of an inductive coil of at least one position sensor of a magnetic bearing of this rotating machine is illustrated in FIG. 1 according to the invention.

As in the prior art, the primary windings 22A of the HF transformer 22 receives on its input terminals 28A, 28B the outputs of the high frequency oscillator generator 30 (delivering an output voltage at a high frequency comprised between 10 and 40 kHz and typically about 20 kHz) the input of which results from a comparison (by a comparator 32) of the output reference 34 and the differential output of a voltage measurement 36 across the inductance coil 12 through the sensing wire 38. Similarly, the output terminals 20A, 20B of the secondary windings 22B of the HF transformer 22 are connected to the input terminals 24A, 24B of the relaying cable 26 connecting the electronic magnetic bearing controller 14 to the rotating machine 10. The length of the relaying or transmitting cable can vary from few meters to hundreds of meters and consequently the capacitance of the cable can vary from few nano Farads to some decades of nano Farads. So, basically, the current to be compensated into the inductive coil 12 having a typical value between 250 µH and 1 mH can vary from 0.5 to 2 Amperes.

According to the invention, an automatic reactive power compensation device 40 is provided for automatically compensating the reactive power consumed by the inductive coil 12 of the position sensor. More particularly, the automatic reactive power compensation device receives a reactive current I1 proportional to the current in the inductive coil and delivers a compensation current Icomp across the primary windings 22A of a HF transformer 22 the secondary windings 22B of which being connected to the inductive coil through the relaying cable 26. As illustrated, I1 is extracted on one input terminal 28A at the primary windings 22A of the HF transformer 22.

Figure 2:
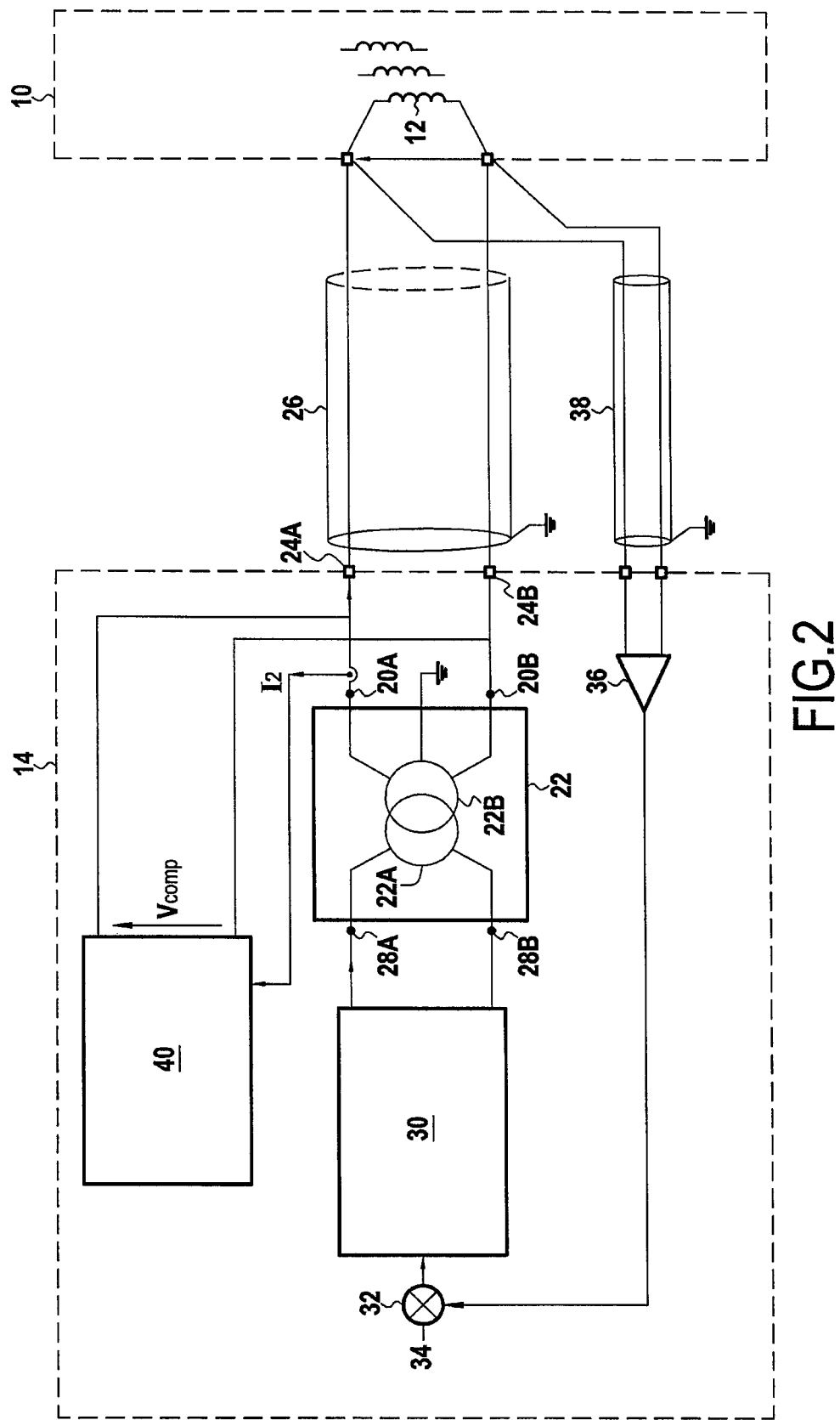
FIG. 2 illustrates a schematic diagram of a second embodiment of an electronic magnetic bearing controller with a reactive power compensation device of an inductive coil of a position sensor according to the invention.

On the contrary, in the configuration of FIG. 2, the compensation current Icomp is delivered across the secondary windings 22B of the HF transformer and the reactive current I2 is extracted at the secondary windings on one output terminal 20A of the HF transformer 22.

Figure 3:
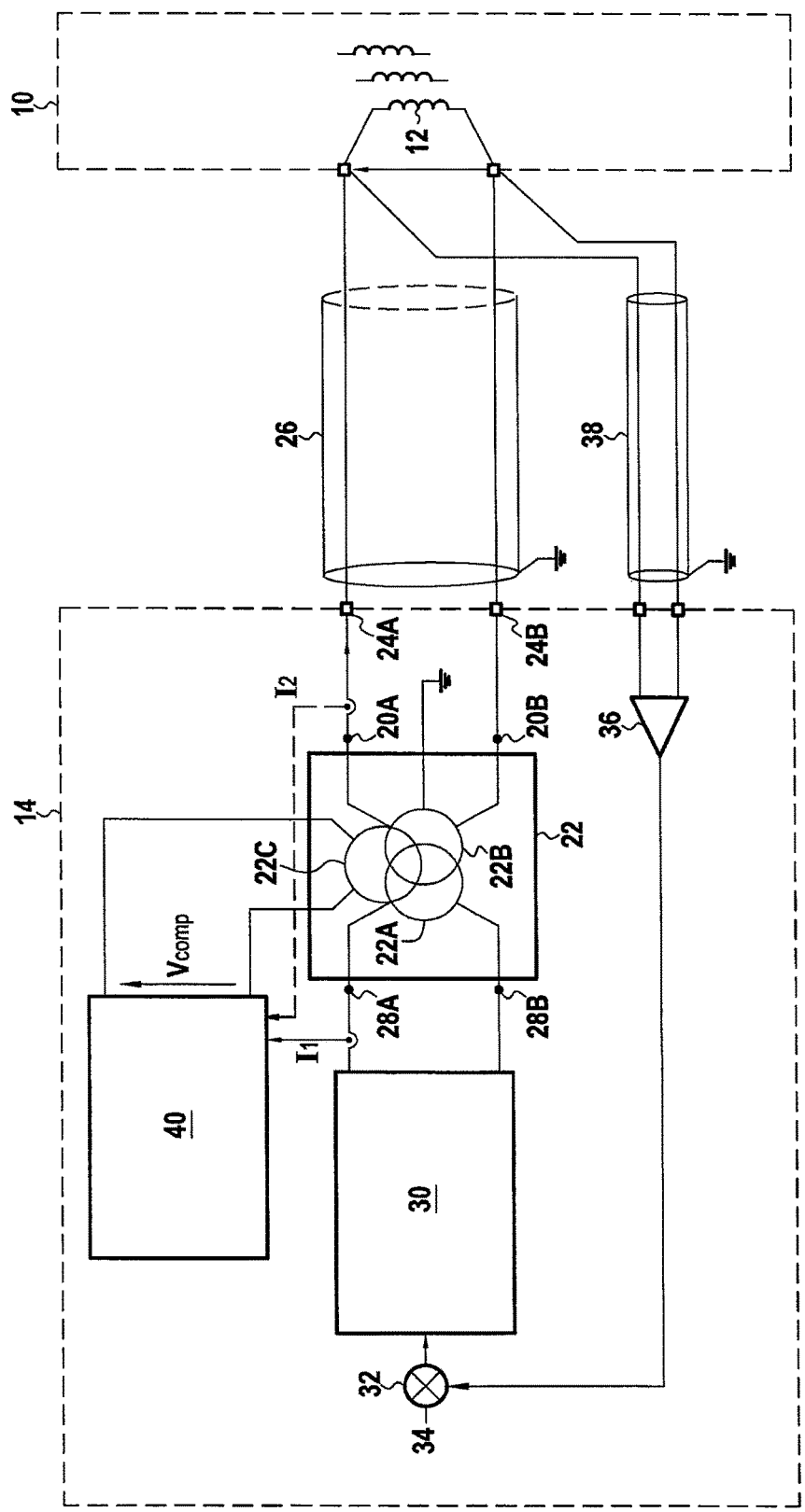
FIG. 3 illustrates a schematic diagram of a third embodiment of an electronic magnetic bearing controller with a reactive power compensation device of an inductive coil of a position sensor according to the invention.

As another alternative, in the configuration of FIG. 3, the compensation current Icomp is delivered across auxiliary windings 22C of the HF transformer 22 and the reactive current I1 is extracted on one input terminal 28A at the primary windings 22A of the HF transformer 22 as in the configuration of FIG. 1. As illustrated in dotted line, the reactive current I1 can be substituted by the reactive current I2 extracted on one input terminal 20A at the secondary windings 22B of the HF transformer.

Figure 4:
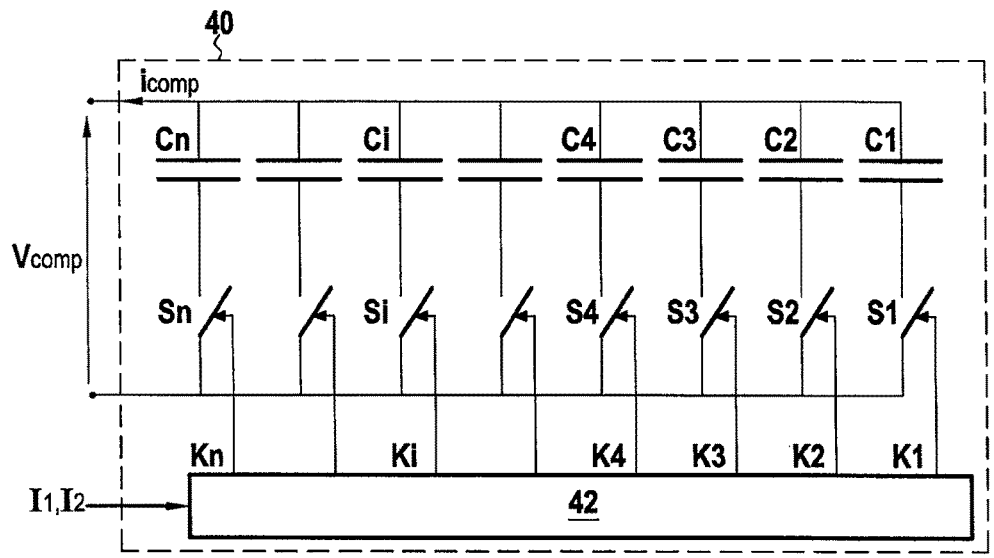
FIG. 4 illustrates a first embodiment of a reactive power compensation device used in the devices of FIGS. 1 to 3.
Figure 5:
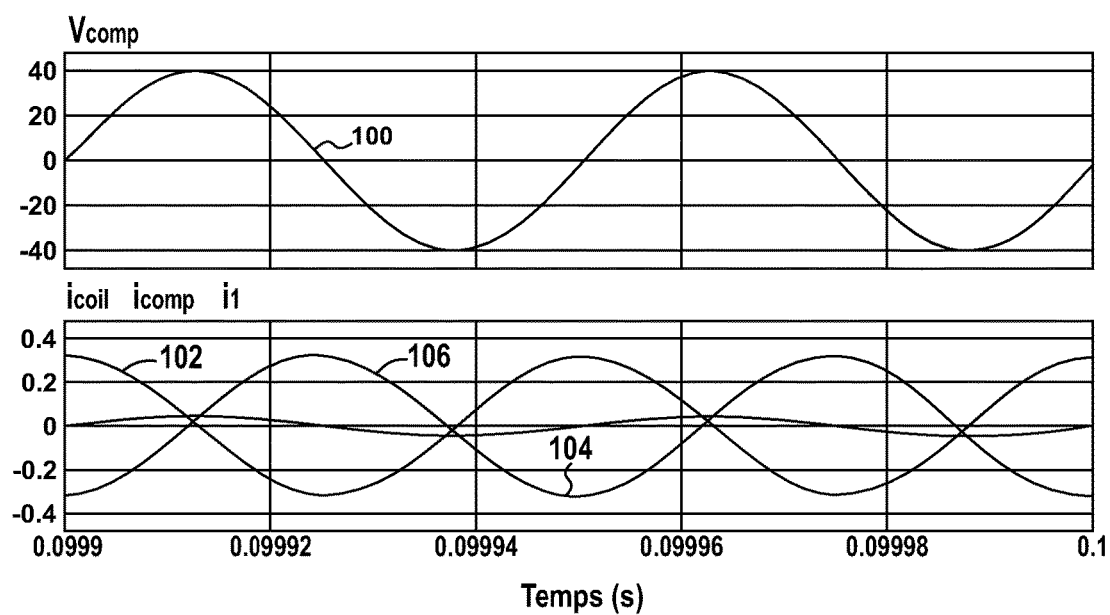
FIG. 5 illustrates different waveforms in the device of FIG. 4.

FIG. 4 illustrates a first embodiment of the automatic reactive power compensation device 40 delivering the compensation current Icomp and comprising a static compensation of reactive current formed by a parallel bank of capacitors C1, C2, . . . , Cn each connected in series with an electronic switch S1, S2, . . . , Sn controlled by a control circuit 42 receiving the reactive current I1 or I2 (depending of the chosen configuration) and delivering open or close control signals K1, K2, . . . , Kn for the n electronic switches. Between the common junction point of all capacitors and the common junction point of all electronic switches which are preferably conventional thyristors or triacs for example is measured a voltage named Vcomp and illustrated by reference 100 on FIG. 5. On this figure, references 102, 104 and 106 correspond to Icomp, I1, Icoil (current in the inductive coil 12) respectively.

With this static compensation consisting of switching a fixed number of capacitors according to the reactive current to compensate, it is possible to obtain either an over or an under compensation but not a thin adjustment of the reactive current.

Figure 6:
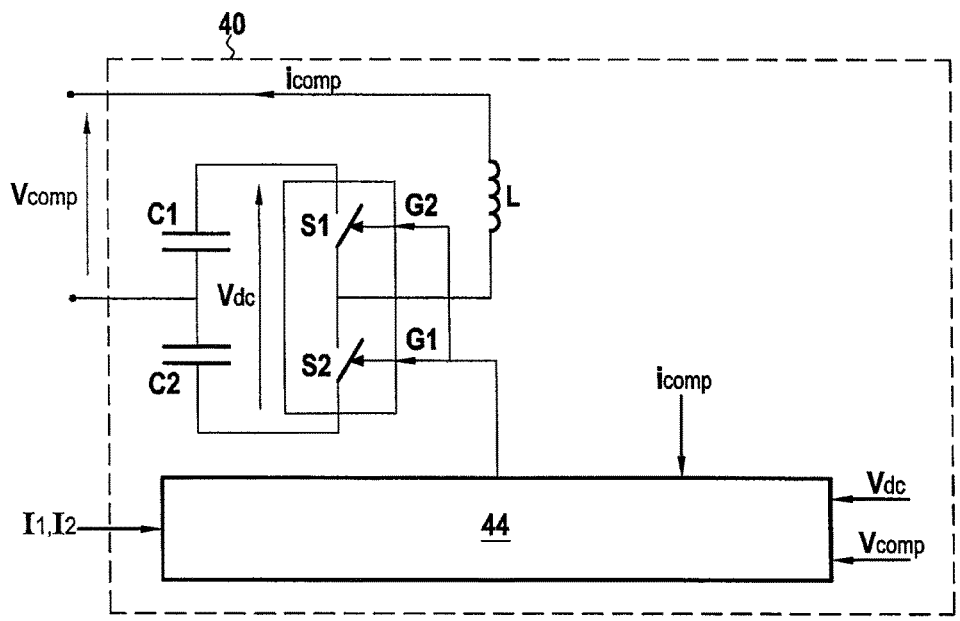
FIG. 6 shows a second embodiment of a reactive power compensation device used in the devices of FIGS. 1 to 3.
Figure 7:
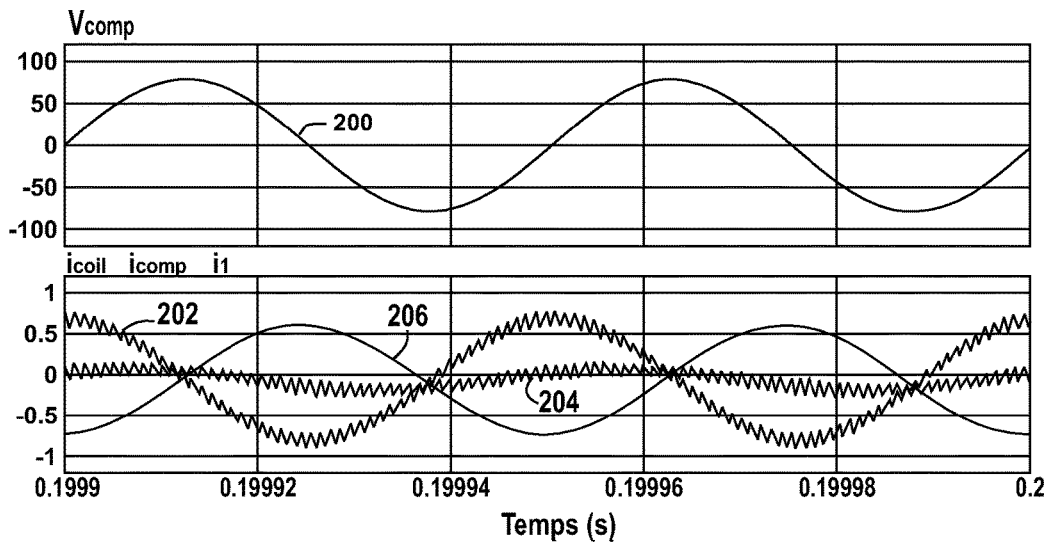
FIG. 7 illustrates different waveforms in the device of FIG. 6.

FIG. 6 illustrates a second embodiment of the automatic reactive power compensation device 40 delivering the compensation current Icomp and comprising a dynamic compensation of reactive current formed by a half-bridge of two electronic devices S1, S2 each connected in series with a capacitor C1, C2 and controlled by a control circuit 44 receiving the reactive current I1, I2 and delivering a PWM control signal G1, G2 for the two electronic devices. Between the junction point of the two capacitors and a first extremity of an inductance L (through which the compensation current Icomp is obtained) the second extremity of which being connected at the junction point of the two electronic devices is measured a voltage named Vcomp and illustrated by reference 200 on FIG. 7. On this figure, references 202, 204 and 206 correspond to Icomp, I1, Icoil respectively.

Figure 8:
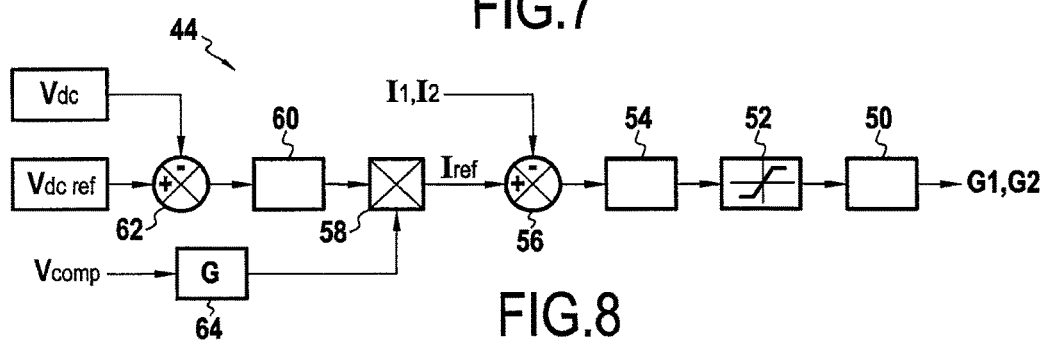
FIG. 8 shows a simplified synoptic of the control circuit of the reactive power compensation device of FIG. 5.
Figure 9:
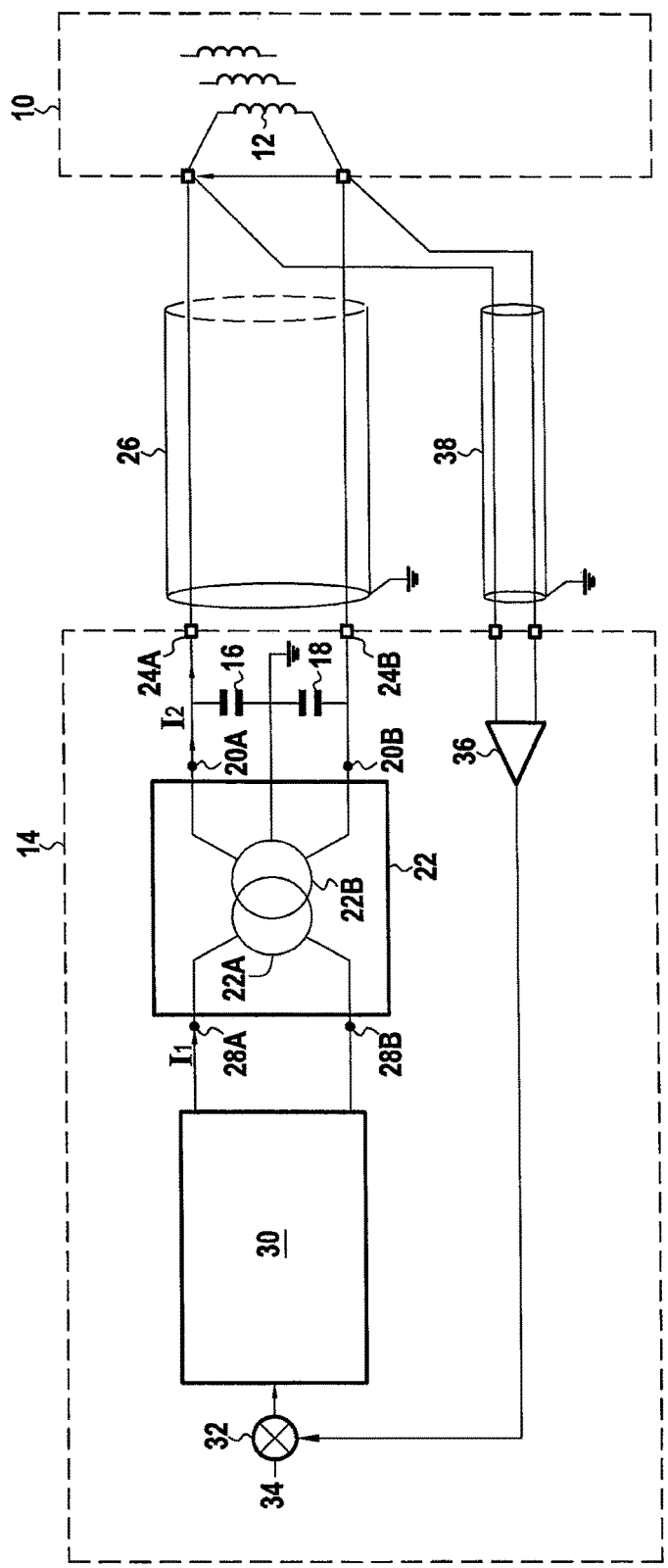
FIG. 9 illustrates a schematic diagram of a prior art electronic magnetic bearing controller with a reactive power compensation device of an inductive coil of a position sensor.

More particularly, as detailed in FIG. 8, the control circuit 44 comprises a PWM inverter logic 50 operating at a switching frequency between 200 kHz and 1 MHz and receiving (via a saturation block 52) a set voltage from a PI controller 54 which receives an error signal generated in a differentiator 56 by the difference between the reactive current I1, I2 and a reference current Iref. This reference current is provided by a multiplier 58 receiving on the one hand its magnitude calculated by a PI controller 60 which receives an error signal generated by a difference obtained in a differentiator 62 between a voltage Vdc applied to the two electronic devices and a reference voltage VdcRef and one the other hand (preferably via a gain module 64) the measured voltage Vcomp that is necessary to build the phase angle of the reference current Iref. The electronic devices are preferably conventional MOSFET transistors or SiC MOSFET transistors.

With this dynamic configuration consisting of generating or absorbing reactive power without requiring a bank of capacitors, it is possible to control and to compensate in real time the reactive current whatever is the reactive current to be compensated, the cable length and the number of bearing sensor coils connected to the machine. If for any reason, the machine is disconnected or the bearing sensors are partially or totally broken, the reactive current is no more compensated or partially compensated by adjusting in real time the compensating current Icomp.

The invention is particularly suitable for active magnetic bearings of important machines like chiller or turbo-expander for example as for active magnetic bearings within smaller systems like HVAC for cars or trucks.

Although preferred embodiments have been shown and described, it should be noted that any changes and modifications may be made therein without departing from the scope of the invention as defined in the appended claims.

The invention claimed is:

1. An electronic magnetic bearing controller for controlling a position of a rotor of an electrical machine supported by an active magnetic bearing, a position of the active magnetic bearing being measured by at least one inductive position sensor having an inductive coil, the electronic magnetic bearing controller comprising:
   an automatic reactive power compensation device comprises a static compensation of a reactive current, the static compensation being formed by a parallel bank of capacitors controlled by a control circuit,
   wherein the automatic reactive power compensation device automatically compensates a reactive power consumed by the at least one inductive position sensor, receives the reactive current proportional to a current in the inductive coil, and delivers a compensation current across primary windings of a transformer, and
   wherein secondary windings of the transformer are connected to the inductive coil through a relaying cable,
   wherein the static compensation comprises switching a fixed number of the parallel bank of capacitors according to the reactive current to obtain an over or an under compensation of the reactive current, the reactive current comprising a primary current across primary windings of the transformer or secondary current across secondary windings of the transformer.

2. The electronic magnetic bearing controller of claim 1, wherein the reactive current is a primary current across the primary windings.

3. The electronic magnetic bearing controller of claim 1, wherein the reactive current is a secondary current across the secondary windings.

4. The electronic magnetic bearing controller of claim 1, wherein the automatic reactive power compensation device delivers the compensation current across auxiliary windings of the transformer.

5. The electronic magnetic bearing controller of claim 1, wherein each of the parallel bank of capacitors is connected in series with an electronic switch controlled by the control circuit receiving the reactive current and delivering one of open or close control signals for the electronic switches.

6. The electronic magnetic bearing controller of claim 5, wherein the electronic switches are thyristors or triacs.

7. The electronic magnetic bearing controller of claim 1, wherein the automatic reactive power compensation device comprises a dynamic compensation of the reactive current formed by a half-bridge of two electronic devices, each electronic device connected in series with a capacitor and controlled by the control circuit receiving the reactive current and delivering a Pulse-Width Modulation (PWM) control signal for the two electronic devices.

8. The electronic magnetic bearing controller of claim 7, wherein the electronic devices comprises a MOSFET or a Silicon Carbide (SiC) MOSFET.

9. The electronic magnetic bearing controller of claim 7, wherein the control circuit comprises a PWM inverter logic operating at a switching frequency between 200 kHz and 1 MHz and receiving a set voltage from a Proportional-Integral controller (PI controller), which receives an error signal generated by a difference between the reactive current and a reference current.

10. The electronic magnetic bearing controller of claim 9, wherein the reference current is provided by a multiplier receiving a set voltage from the PI controller that receives an error signal generated by a difference between a voltage applied to the two electronic devices and a reference voltage.

11. The electronic magnetic bearing controller of claim 1, further comprising a high frequency oscillator generator delivering an output voltage at a high frequency for the primary windings to that it is connected.

12. The electronic magnetic bearing controller of claim 11, wherein the high frequency is between 10 and 40 kHz.

13. The electronic magnetic bearing controller of claim 11, wherein the high frequency is about 20 kHz.

* * * * *